United States Patent [19]
Pape et al.

[11] Patent Number: 5,971,499
[45] Date of Patent: Oct. 26, 1999

[54] HYDROMECHANICALLY REGULATED VEHICLE BRAKE SYSTEM

[75] Inventors: Steven G. Pape, Brooklyn Park, Minn.; Robert G. Stuttgen, 10840 Mankato St., Blaine, Minn. 55449

[73] Assignee: Robert G. Stuttgen, Blaine, Minn.

[21] Appl. No.: 08/805,309

[22] Filed: Feb. 25, 1997

[51] Int. Cl.⁶ .................................................. B60T 7/02
[52] U.S. Cl. .......................................... 303/9.61; 188/345
[58] Field of Search ................. 188/345; 303/9.61–9.64, 303/2

[56] References Cited

U.S. PATENT DOCUMENTS

| | | | |
|---|---|---|---|
| 4,465,322 | 8/1984 | Hayashi | 303/9.64 |
| 4,598,954 | 7/1986 | Hayashi | 303/9.61 |
| 5,372,408 | 12/1994 | Tsuchida et al. | 303/9.61 |
| 5,501,511 | 3/1996 | Wagner | 188/9.61 |
| 5,564,534 | 10/1996 | Toyoda et al. | 188/345 |

*Primary Examiner*—Matthew G. Graham
*Attorney, Agent, or Firm*—Dwight N. Holmbo

[57] ABSTRACT

An improved hydraulic brake system accommodates multiple, e.g. primary and secondary actuation forces while maintaining independence of operation between primary and secondary brake subsystems. A secondary subsystem line pressure booster draws its charging fluid from the primary system line using a split piston, free backflow, volume displacement approach. The improved brake system has a temperature sensitive condition sensing hydromechanical fuze to sense hydraulic line flow for velocity, volume, direction and pressure. The brake system also employs an input flow control valve to direct fluid flow in the secondary subsystem.

8 Claims, 6 Drawing Sheets

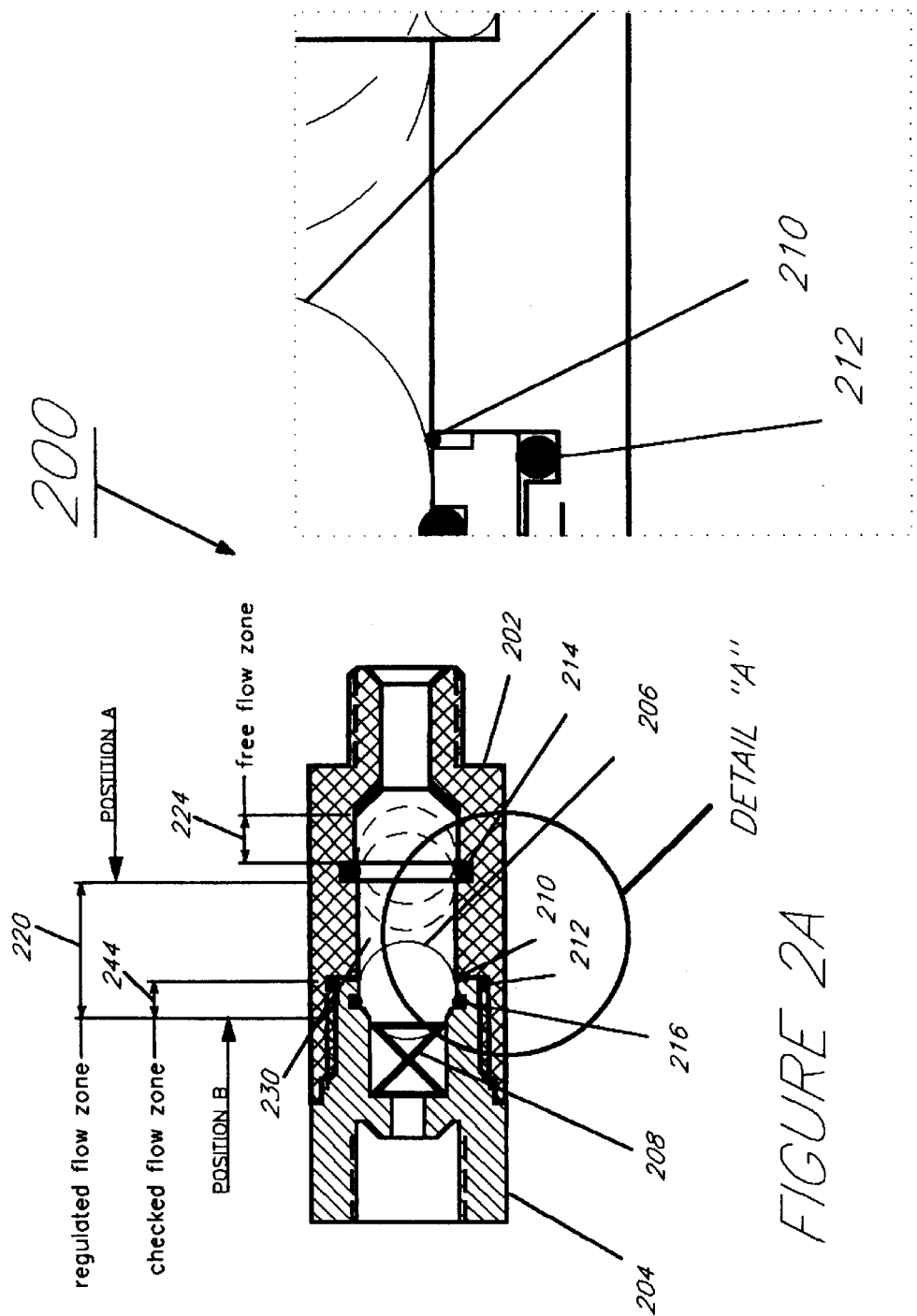

HYDROMECHANICALLY REGULATED VEHICLE BRAKE SYSTEM

BACKGROUND OF THE INVENTION

1. Field of the Invention

The present invention relates generally to brake systems, and more particularly to an improved vehicle brake system for use with vehicles which employ more than one independent braking subsystem, e.g. which employ both hand and foot manual input forces.

2. Description of the Prior Art

It is desirable to have a hydromechanically regulated vehicle brake system which accommodates dual hand and foot manual input forces, such that deterioration or failure of one of the two subsystems (such as hand and foot) will not disable the other. Hydromechanical brake systems are commonly utilized on recreational vehicles such as all terrain vehicles (ATV) as well as motorcycles. Hydraulic brakes often are used as foot brakes on automobiles. Automotive brake systems use liquid pressure to force brake pads against rotors on selected wheels and thus stop the wheels from turning. The liquid is contained in actuation devices called brake calipers. These calipers are connected by special tubing to a pressure and flow generating device called a master cylinder, which is connected to the hand or foot operated force input lever. When the driver actuates the lever, the lever pushes a piston in the master cylinder. This piston forces fluid through the tubes and against the pistons in the calipers. These pistons force the brake pads against the brake rotors or drums, which slows or stops the wheel from turning.

Many of the basic principles of automotive hydraulic brake operation are common to recreational vehicle brake systems which employ hydraulic braking. Recreational vehicles also employ more than a single independent braking system. Examples include a hand operated brake as well as a foot operated brake. It is desirable to have a system for such vehicles, which will allow for integrated operation of all independent braking system calipers from a selected primary system input device which may be hand or foot operated, as well as a secondary mode of operation from a second input device.

SUMMARY OF THE INVENTION

The present invention is directed to an improved vehicle brake system for use with vehicles which employ more than one independent braking subsystem. The novel system employs a hydromechanical sensing device (fuze) to sense hydraulic line flow velocity, volume, pressure and temperature. A unique feature of this fuze is its ability to set itself when normal system operation parameters are exceeded and then unset itself if system integrity is sensed. This feature is accomplished via sensing a brake system feedback pressure from a sealed off portion of the brake system. The fuze is temperature sensitive and accommodates hydraulic fluid viscosity changes due to temperature variations via selecting materials having specific thermal coefficients of expansion. The selected materials precisely limit dimensional changes in the hydraulic flow clearances, resulting in temperature compensated flow rates through the fuze assembly.

The novel system also employs a second hydromechanical sensing device (isolator) to seal off and direct hydraulic fluid flow in a secondary system. The isolator ensures fully independent operation of either subsystem independently. The isolator also allows simultaneous operation of both subsystems. For example, if the primary brake system is damaged or becomes inoperative, the isolator automatically reacts to the resultant lower system pressure and seals off the damaged or unusable portion of the brake system from the remaining subsystem to ensure continued operation of a portion of the vehicle brake system.

The novel system also employs a secondary subsystem line pressure booster. This pressure generating device is similar to a master cylinder, such as discussed herein above, but unlike a typical master cylinder, it must draw its charging fluid from the primary system line, as it does not have a vented fluid reservoir. The pressure booster has a split piston which is directly actuated by manual operator inputs and operates via free backflow and volume displacement principles.

The present invention provides a solution to the problems and shortcomings inherent in prior art dual hydraulic braking systems and devices by providing a hydromechanically regulated vehicle brake system capable of replacing any vehicle brake system which accommodates multiple manual input forces, but which must also maintain independence of operation between the subsystems such that failure of one of the subsystems will not disable or impair the integrity of the other.

A feature afforded by the present invention is the provision of a brake system which automatically senses all manual operator inputs and automatically regulates the entire vehicle brake system functions in response thereto.

Another feature afforded by the present invention is the provision of a brake system which can easily and swiftly be adapted to retrofit existing single master cylinder operated brake systems (primary systems) to allow for single point operation of all calipers while simultaneously providing the ability to override subsystems independently of primary system operation.

Another feature afforded by the present invention is the provision of a brake system which is completely self-regulating and self-adjusting, and which eliminates the necessity for making system or device adjustments due to wear, operating condition fluctuations or changes, or even due to replacement of worn brake pads.

Yet another feature afforded by the present invention is the provision of a brake system having primary and secondary hydraulic subsystems which share the same fluid circuits and a single input operation, and yet which provides for operator selection to operate the system and one or more subsystems independently.

Still another feature afforded by the present invention is the provision of a brake system wherein a primary subsystem normally operates all vehicle brake calipers and wherein a secondary subsystem can be used independently or in cooperation with the primary subsystem sharing the same hydraulic circuits.

Still another feature afforded by the present invention is the provision of interrelated hydromechanical sensing, regulating and pressure boosting devices in a multiple manual input force operated vehicle brake system.

BRIEF DESCRIPTION OF THE DRAWINGS

Other features of the present invention and many of the attendant advantages of the present invention will be readily appreciated as the same becomes better understood by reference to the detailed description when considered in connection with the accompanying drawings in which like reference numerals designate like parts throughout the figures thereof and wherein:

FIG. 2A is a detailed cutaway view of a condition sensing hydromechanical fuze suitable for use in accordance with one embodiment of the present invention as shown in FIG. 1;

FIG. 2B is an enlarged cutaway view more clearly depicting details of the retainer portion of the condition sensing hydromechanical fuze illustrated in FIG. 2A;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

The preferred embodiments described as follows, address the long felt need by those in the off road vehicle and motorcycle industries to provide a reliable hydromechanical braking system which is responsive to primary and secondary subsystem actuation forces using the same flow circuits and simultaneously maintain independence of operation between the two subsystems, such that failure of one of the two subsystems will not disable or impair operation of the other subsystem. The present invention utilizes interrelated hydromechanical sensing, regulating and pressure boosting devices in a dual input operated vehicle brake system to improve rider safety by eliminating potential brake loss in the event of an unplanned brake line or caliper failure or disablement. The present invention also reduces the necessity for providing brake system maintenance by eliminating routine mechanical brake adjustments. Further, the present invention provides enhanced brake system flexibility through simplified adaptation to related but different applications. It will be apparent from the discussion herein below, the present invention provides completely independent operation of multiple interrelated hydraulic brake subsystems while allowing these subsystems to operate simultaneously in the same hydraulic circuit from a single fluid feed reservoir. Finally, the present invention allows a dual master cylinder system to operate a brake caliper(s) independently from either the primary or secondary master cylinder(s), or simultaneously from both master cylinders without requiring the use of separate and distinct caliper chambers, pistons or external mechanical actuating devices.

Figure 1:
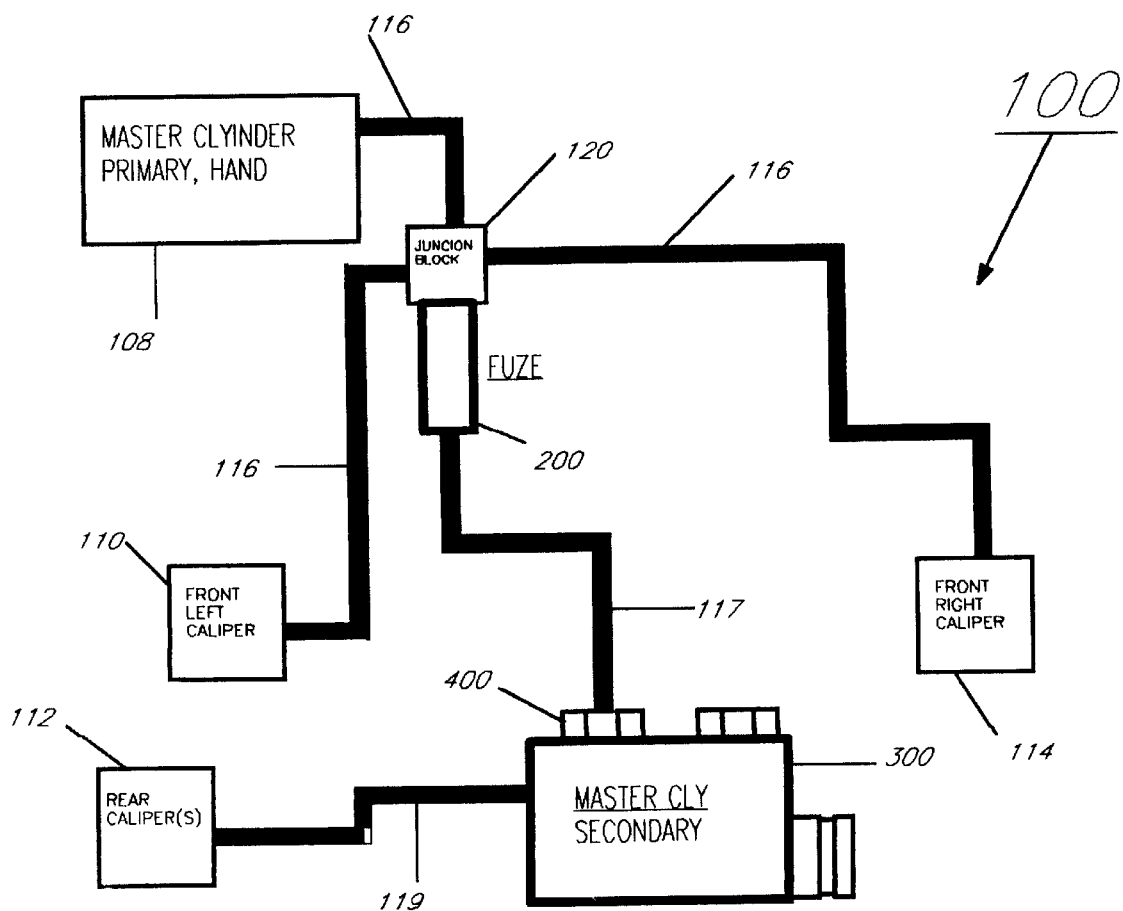
FIG. 1 is a simplified block diagram illustrating use of a fuze, flow control valve and secondary subsystem pressure booster to form a hydromechanically regulated vehicle brake system in accordance with one embodiment of the present invention.

Looking now at FIG. 1, a simplified block diagram illustrating use of a hydromechanical fuze assembly 200, flow control valve assembly 400 and secondary subsystem pressure booster (secondary master cylinder assembly) 300 to form a hydromechanically regulated vehicle brake system 100 in accordance with one embodiment of the present invention is shown. The system 100 illustrated shows the hand master cylinder 108 adapted for use as the primary master cylinder and the foot master cylinder 300 adapted for use as the secondary master cylinder. The present invention is not so limited however, and it will readily be appreciated that the system 100 can also be easily adapted to use the foot master cylinder 300 as the primary master cylinder for the system 100 and the hand master cylinder 108 as the secondary master cylinder. With continued reference to FIG. 1, operation of the vehicle brake system 100 will be described herein below for a plurality of different operating conditions to clarify overall system 100 operation and identify operational interrelationships among individual system 100 components.

The hydromechanical fuze assembly 200 senses hydraulic fluid flow rate, flow volume, flow direction, secondary system back pressure and temperature during operation to prevent loss of vehicle brakes in the event a secondary system is damaged to the point of serious hydraulic fluid leakage. The fuze assembly 200 provides for specific regulated flow volume and seals off the secondary system if the flow volume is exceeded. The fuze assembly 200 generally senses system integrity, discriminating between system damage and unanticipated caliper piston "push back". Further, the fuze assembly 200 prevents system leak down when slow leaks occur during use and/or storage periods.

The present inventive in-line secondary master cylinder assembly 300 provides for secondary system fluid flow and pressure, either independently or simultaneously with the primary system. The secondary master cylinder assembly 300 in-line feature allows the entire unit to be pressurized, eliminating any need for a vented fluid reservoir, or line running to a remote reservoir. The secondary master cylinder assembly 300 operates in a prepressurized system because it has no compensation port, allowing the assembly 300 to generate pressure regardless of system starting pressure, without seal damage generally caused by passing over a compensation port while under pressure. As discussed further herein below, the assembly 300 is fully pressure relieving at the end of its return stroke, ensuring system equilibrium is reached at the end of every stroke. Furthermore, the assembly 300 can be mounted in any orientation with only air bleed port changes required, is capable of operating multiple downstream calipers and devices at remote locations where mechanical linkages would be difficult to utilize, and supports elimination of mechanical secondary braking devices which require periodic adjustments to remain functional.

The subsystem hydraulic input flow control valve assembly 400 is used in the present invention to positively separate a primary system from a secondary system, while allowing both systems to function simultaneously in the same hydraulic circuit 100. The control valve assembly 400 addresses the need for independent operation of the primary and secondary systems while allowing both systems to share the same hydraulic circuit 100. Further, the assembly 400 effectively eliminates the necessity for dual lines to a single brake caliper to enable dual brake system operation. As discussed further herein below, the present inventive valve assembly 400 allows independent operation of a brake caliper(s) from the primary and/or secondary system pressure sources without having to use separate chambers or pistons in the caliper via directing input flow from the dominant flow and pressure source.

Stroking the primary master cylinder 108 input uniformly pressurizes the entire vehicle brake system 100 under normal operating conditions. As the vehicle operator continues stroking the primary master cylinder 108, normal system braking is achieved and the operator will observe a noticeable increase in the firmness associated with continued stroking. Continued stroking causes hydraulic fluid to flow through the hydraulic fluid lines 116, 117, 119 and through individual system 100 components 200, 400, 300, 110, 112, 114, 120 until the desired pressure is achieved. The fuze assembly 200, described in detail herein below, operates in its normal regulated flow zone so long as the system 100 integrity remains stable, and therefore has no effect on brake system 100 operation. Under stable brake system 100 conditions, the hydraulic input flow control valve assembly 400 is seated in its low position. The secondary master cylinder 300 remains unstroked and uniformly pressurized via the free backflow port from the primary system including primary master cylinder 108.

A steady state input via the primary master cylinder 108 results in a uniformly pressurized system 100 wherein all system 100 components 108–400 are uniformly pressurized. When a single input stroke is established as firm and stationary, the primary master cylinder 108 then becomes pressurized and stationary via a single input partial stroke under normal operating conditions. In the absence of further stroking via the primary master cylinder 108, the fuze assembly 200 slowly returns to its normal unstroked position away from the metering ball return spring 208, where it continues to have no operational effect on the overall brake system 100 operation. Hydraulic input flow control valve assembly 400 remains seated in its low position. As before, the secondary master cylinder 300 then continues to remain unstroked and uniformly pressurized via the primary system including the primary master cylinder 108.

All system 100 components 108–400 become uniformly depressurized when a decreasing pressure input results from discontinued primary master cylinder 108 stroking. This condition normally occurs when a brake lever or handle, for example, is returning from a stroke during which the vehicle operator will notice a markedly softening feel associated with the braking lever stroke. During the depressurization process, hydraulic fluid is returning to the primary master cylinder 108 via the system hydraulic fluid lines 116, 117, 119. The backflow of system hydraulic fluid maintains the hydromechanical fuze assembly 200 in a returning-to-sealed or fluid free flow condition where it remains in a steady-state position ready to begin operation in its normal regulated flow zone or alternatively ready to seal itself in the event to brake system 100 failure. Depressurization also has no effect on operation of the hydraulic input flow control valve assembly 400 or operation of the secondary master cylinder 300 which remains transparent to the primary system unless it is actuated to close the free backflow port 348. If the secondary master cylinder 300 generates flow and pressure exceeding the primary system pressure, it will seal off the primary system through the input flow control valve assembly 400.

Stroking the secondary master cylinder 300 via a foot brake pedal, for example, until the stroking becomes firm, causes the secondary master cylinder 300 to generate hydraulic fluid flow through hydraulic fluid line 116 into the rear brake caliper(s) 112. Only the rear brake caliper(s) 112 can receive hydraulic fluid flow generated via the secondary master cylinder 300. Stroking the secondary master cylinder 300 has no operational impact on the primary master cylinder 108 which remains unstroked and stationary. However, it will be appreciated that sudden instantaneous stroking of the secondary master cylinder 300 will cause a small hydraulic fluid surge into a portion of the primary hydraulic circuit 116, 117. The hydromechanical fuze assembly 200 remains in its normally sealed position while the secondary master cylinder 300 is stroking. The hydraulic input flow control valve assembly 400 changes its operational state when back pressure caused by stroking the secondary master cylinder 300 forces the input flow control valve 400 to switch from its normal seated low position to a seated high position causing the primary system 116, 117 and related components 108, 120, 200, 110, 114 to be isolated from the secondary brake system 119 and rear caliper(s) 112. This condition wherein the secondary master cylinder 300 is stroking and generating hydraulic fluid flow forces a split piston, described herein below, within the secondary master cylinder 300 to close. Flow volume is generated primarily via the displacement of fluid by the piston shaft 316 with a small flow volume drawn from the primary brake system defined by that portion of the vehicle brake system 100 which is located on the opposite side of the input flow control valve assembly 400 connected to the secondary master cylinder 300.

A steady state secondary brake system input caused via an operator pressing firmly down on a vehicle brake pedal, for example, will pressurize only the rear caliper(s) 112 and line 119, as stated herein above. If the primary master cylinder 108 remains unstroked, unpressurized and stationary, the hydromechanical fuze assembly 200 will then remain sealed in its upper fuze seal position and the hydraulic input flow control valve assembly 400 will remain seated high to effectively isolate the primary master cylinder 108 from the secondary brake system rear caliper(s) 112. The stroked position of the secondary master cylinder 300 causes the split piston portion of the secondary master cylinder 300 to close, thereby allowing the secondary master cylinder 300 housing to generate pressure regardless of primary system status.

Upon decreasing the secondary brake system pressure, e.g. removing pressure from the secondary brake pedal which causes a softening feel by the operator on the return stroke of the brake pedal, the rear caliper(s) is depressurized, allowing hydraulic fluid to return to the secondary master cylinder 300. If the primary master cylinder 108 remains unstroked, unpressurized and stationary, the primary master cylinder 108 may receive hydraulic fluid from the secondary master cylinder 300 while the secondary master cylinder 300 is being depressurized. During conditions of decreasing secondary brake system input and unpressurized, stationary primary brake system input, the hydromechanical fuze assembly 200 remains sealed on its upper seal or alternatively, in the free flow zone 224, and the hydraulic input flow control valve assembly 400 remains seated high to isolate the primary master cylinder 108 and system 116, 117. Decreasing the secondary brake system input allows an internal piston spring, described herein below, within the secondary master cylinder 300 to return the split piston to its normal unpressurized position such that hydraulic fluid drawn from the primary portion of the brake system 100 is allowed to return to that portion of the brake system 100.

It is to be appreciated that the inventive vehicle brake system 100 can also be operated with simultaneously increasing primary and secondary brake system inputs such that the primary master cylinder 108 and the secondary master cylinder 300 as well as all brake system 100 components 108–400 are uniformly pressurized. This condition is representative of the situation which occurs when the primary and secondary brake handles, levels, pedals, etc. (hereinafter levers) are both becoming firm with minimum stroke, thereby generating hydraulic fluid flow and pressure within the primary and secondary master cylinders 108, 300 as the brake stroking continues. During conditions of simultaneous primary and secondary brake system stroking, the hydromechanical fuze assembly 200 also strokes within its regulated flow zone while the hydraulic input flow control valve assembly 400 floats with the dominant hydraulic fluid flow direction. The present invention can therefore provide differential braking to front versus rear brake calipers, for example, to change the ratio of front to rear brake forces.

A condition of equal steady-state primary and secondary brake system inputs, indicative of the primary and secondary brake levers being firm and stationary, results in a uniformly pressurized vehicle brake system 100. This condition is capable of fully pressurizing the primary master cylinder 108 with only a partial input stroke. The steady state inputs allow the hydromechanical fuze assembly 200 to slowly return to its normal unstroked position while allowing the hydraulic input flow control valve assembly 400 to float, as stated above, with the dominant oil flow direction. The steady state inputs also maintain the secondary master cylinder 300 in a stroked and stationary condition such that the aforesaid internal split piston is forced to close and allow the secondary master cylinder 300 housing to fully pressurize.

Yet another mode of operating the present inventive brake system 100 occurs when the primary and secondary brake system inputs are simultaneously decreasing causing all system components 108–400 to uniformly depressurize. This condition can result, for example, when both (primary and secondary) brake levers are returning from an input stroke and softening or releasing the input applied pressure. As described above, this condition also allows hydraulic fluid to return to the primary master cylinder 108 from the pressurized system 100. As the system pressure decreases, the hydromechanical fuze assembly 200 returns to its normal upper seal position and the hydraulic input flow control valve assembly 400 operates in its floating condition controlled by the dominant hydraulic fluid flow direction. The decreasing pressure also allows the secondary master cylinder 300 internal piston spring to operate, forcing the split piston to return to its normal unpressurized position such that hydraulic fluid is returned to the primary portion of the vehicle brake system 100 as well as the displaced volume of the secondary master cylinder 300 housing.

The present invention also accommodates the unique operational situation whereby a primary brake system input overtakes a secondary system input, e.g. the secondary brake system pressure is overcome by a higher primary brake system pressure. This unique situation may result, for example, when increasing the primary brake pressure provides total brake system 100 control as the primary brake system input is being stroked and generating hydraulic fluid flow. During the takeover process, the hydromechanical fuze assembly 200 will continue to be stroked, but with reduced volume, while the hydraulic input flow control valve assembly 400 will shift from its upper seal operating position to its lower seal operating position. The aforesaid operational characteristics of the system components 200, 400 will allow the secondary master cylinder 300 internal pressure to increase with increased primary system pressure while the secondary master cylinder 300 input pressure remains unaffected.

In contradistinction to the aforesaid unique operational situation, the secondary brake system input may also overtake the primary brake system input to control the rear caliper(s) 112 when the secondary brake system input pressure exceeds the primary brake system input pressure. Operationally, the system operator may sense a slight pulse in the primary input lever as the hydraulic input flow control valve assembly 400 shifts its operating mode. When the secondary brake system input overtakes the primary brake system input, the hydromechanical fuze assembly 200 will return to it upper seal operating position while the hydraulic input flow control valve assembly 400 shifts from its lower seat position to its upper seat operation position leaving the secondary master cylinder 300 free to generate flow and pressure as it is stroked.

The present inventive brake system 100 can also operate effectively while the primary and secondary inputs are oscillating such that the hydraulic pressure oscillates in all brake system calipers 110, 112, 114. During the oscillation process, the hydromechanical fuze assembly 200 and the hydraulic input flow control valve assembly 400 operating modes are also oscillating, i.e. reversing. The vehicle operator will sense pressure pulses in the brake inputs during the oscillation process which result from partial strokes generating pulsating pressures within the primary and secondary master cylinders 108, 300. The fuze assembly 200 and flow control valve assembly 400 each have an internal flow control ball mechanism, described herein below. The fuze assembly 200 flow control ball mechanism flutters between its upper and lower seal operating positions while the flow control valve assembly 400 ball mechanism flutters between its upper seat and its lower seat operating positions while the primary and secondary inputs are oscillating, to allow brake system control to reverse as desired by the vehicle operator.

FIGS. 2A and 2B illustrate a detailed cutaway view of a condition sensing hydromechanical fuze assembly 200 suitable for use in accordance with one embodiment of the present inventive brake system 100 as described herein above and as shown in FIG. 1. The condition sensing fuze assembly 200 is easily adaptable for use in any brake system which must maintain independence of operation between two or more subsystems, such that failure of one of the subsystems will not disable the other(s). The fuze assembly 200 can automatically sense brake system conditions, resetting and adjusting itself to normal operation as discussed herein below.

The fuze assembly 200 safely enables primary and secondary hydraulic circuit cross porting by ensuring that should the secondary portion of the hydraulic system fail, the primary portion will continue to operate normally. Although the fuze assembly 200 is most preferably designed for use with multiple manual input force vehicle brake systems, it will readily be appreciated by those skilled in the art that other nonbrake applications will also benefit from use of the fuze assembly 200. Nonbrake systems which will benefit include but are not limited to those systems which require: 1) the ability to segregate one portion of the system from another based on regulated flow volume and rate; 2) the ability to automatically reset based upon meeting a specific back pressure threshold; 3) operation with low back pressures, limited backflow volumes and exposure to temperature extremes without impairing the fuze ability to operate and reset to the normal regulated operation mode; 4) availability of fluid viscosity compensation for applications where fluid viscosity does not remain sufficiently constant to assure constant fuze performance across a range of temperatures; and 5) normal system operation over very high and fluctuating pressure ranges.

The present inventive fuze assembly 200 will regulate operation of all secondary subsystem components 112, 300, 400 from a single primary subsystem input device 108 which may be hand and/or foot operated, for example. When used in brake system 100 applications, where different size calipers or multiple calipers 110, 112, 114 are generally used, the regulated flow of the fuze assembly 200 is changed to ensure that only the correct volume of fluid is allowed to pass before setting. Once the fuze assembly 200 is set, it will automatically reset itself to normal operation if the regulated portion 112, 116, 117, 300, 400 of the system 100 has maintained integrity. This condition is sensed through the existence of a small back pressure which can only be present if system integrity is preserved. The fuze assembly 200 does not require manual resetting unless a system failure has occurred and maintenance has been performed. In this case, upon completion of maintenance, a small amount of back pressure is introduced in the repaired subsystem to initiate the reset to normal regulated operation.

With continued reference to FIGS. 2A and 2B, the fuze assembly 200 includes an upper body housing 202, a lower body housing 204, a metering ball 206, a return spring 208 and a retainer 210 as well as seals 212, 214 and 216. The upper housing seal 214 provides a sealing function when the system 100 is static. It also serves as a stop to hold the metering ball 206 at position 'A', establishing the travel limit of one end of the regulated flow zone 220. The upper housing seal 214 further serves as a divider between the regulated flow zone 220 and the free flow zone 224. The free flow zone 224 is provided to allow for system 100 air bleeding, backfilling and back flow relief. The regulated flow zone 220 provides the minimum regulated flow volume necessary to reliably operate the regulated subsystem devices 112, 300, 400. The regulated flow zone 220 has a very precise metering ball 206 to nominal bore 230 clearance dimension to regulate fluid bypassing the metering ball 206. The present inventors have found a clearance dimension ranging between 0.0001-inch and 0.0060-inch will provide working results for the present invention with various fuze body 202 and metering ball 206 material combinations described herein for further narrowing the range. A specific combination of materials will determine the clearance necessary to achieve the desired flow rate. A "best range" not greater than 0.0005-inch is established to achieve a desired flow rate for a specific set of material choices. The aforesaid rate of bypass has been found to be an important parameter in establishing flow volumes to set the fuze assembly 200 at position 'B' or to return (reset) to position 'A'. A bypass range of 0.0001 cu-in/sec to 0.09 cu-in/sec was found by the present inventors to be workable. A flow rate of about 0.009 cu-in/sec for the presently embodied geometry was found workable to accomplish approximately a five second metering ball 206 return time. The rate of hydraulic fluid bypass on the return to position 'A' regulates the important fuze assembly 200 recovery time and flow volume rate for returning to position 'A'. In brake system applications, the bypass rate is a parameter of substantial interest, since it determines how quickly a temporarily disabled subsystem, which still possesses basic system integrity, will return to it normal operation as well as how fast the input force must occur to set the fuze 200. When the metering ball 206 comes to rest at position 'B' of the checked zone 244, all hydraulic fluid flow through the fuze assembly 200 stops. At this position 'B', the metering ball 206 is spring 208 loaded against a retainer 210 with a predetermined preload. A preload range of about 1–8 ounce was found by the present inventors to provide workable results for the present invention. The metering ball 206 will stay in this preload position until a specific pressure differential between its two sides (upper body housing 202 and lower body housing 204 ) is sensed, at which time it will unseat and begin its regulated return to position 'A'. A pressure differential of less than 7 psi was found preferable to unseat the metering ball 206 from its preload position 'B'.

The present inventors have found that the present inventive fuze assembly 200 can be used in locations where substantial climatic and environmental extremes may exist. Since fluid viscosity may vary substantially over such temperature extremes, regulated operation would be degraded if viscosity compensation could not be provided. This compensation is provided by carefully selecting materials for the upper body housing 202 and metering ball 206, such that the diametrical clearance between the bore 230 and the metering ball 206 will increase or decrease at a rate which is approximately proportional to changes required to maintain relatively constant fluid flow rates around the metering ball 206 regardless of changes in fluid viscosity. Upper body housing 202 materials comprising aluminum and steel and metering ball 206 materials comprising aluminum, steel and polymers were found by the present inventors to provide optimal results. In cases where temperature extremes are not encountered, lower cost materials of similar thermal coefficients of expansion can be used without detrimental effects to regulated flows.

Figure 5:
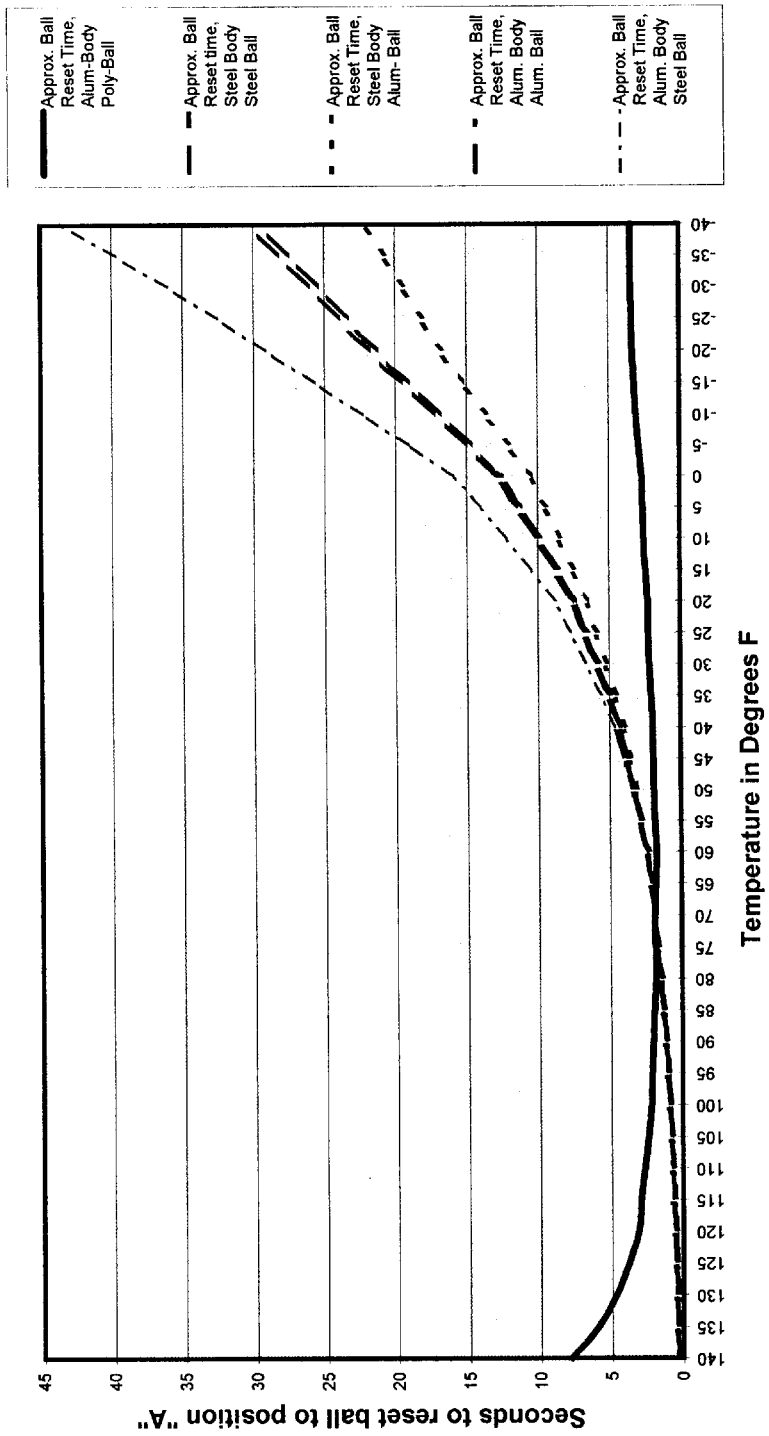
FIG. 5 is a graph illustrating the interactive effects of different materials to precisely control hydromechanical fuze reset times in accordance with the present invention.

FIG. 5 is a graph illustrating the interactive effects of different materials to precisely control hydromechanical fuze reset times in accordance with one embodiment of the present invention. For example, a thermal analysis of fuze assemblies 200 having identical bores 230 and ball 206 sizes, but made from dissimilar materials, shows how material selection provides precise tailoring of the fuze assembly 200 reset times. A fuze assembly 200 comprising an aluminum body housing 202 and a polymer ball 206 has a nearly constant reset time when used at temperatures below approximately 120° Fahrenheit whereas a fuze assembly 200 comprising various combinations of steel and aluminum display significantly different reset characteristics over a temperature range of −40° F.–140° F. as shown. It can be seen that a specific hydraulic system can easily be tailored with a fuze assembly 200 which will provide the desired results over a temperature range of interest.

As stated herein before, the upper body housing 202 comprises a free flow zone 224. The free flow zone 224 provides for free flow of fluid around the metering ball 206 which enables air bleeding back through the fuze assembly 200 and allows for vacuum and pressure filling of the brake system 200, which are necessary in high volume production manufacturing. The upper body housing 202 also comprises a regulated flow zone 220 for regulating fluid flow through the fuze assembly 200. Fuze assembly 200 performance within specified parameters is achieved by setting the diametrical clearance between the metering ball 206 and the fuze assembly bore 230, setting the return spring force applied to the metering ball 206, and selecting body and ball materials which tend to cancel the effects of viscosity changes in the fluid over extreme temperature variations.

With continued reference to FIGS. 2A and 2B, the upper body housing seal 214 prevents leakage of fluid through the assembly 200 when the metering ball 206 is stopped against it. This seal 214 also provides a stop for the metering ball 206, locating the metering ball 206 at position 'A'. Further, this seal 214 prevents the metering ball 206 from entering the free flow zone 224 unless sufficient back pressure exists to push it past the seal 214. This upper body housing seal 214 has been found important to prevent system leakdown, even when integrity has been lost in the regulated subsystem, by blocking fluid flow through the fuze assembly 200. Further, seal 214 prevents system 100 leakdowns during extended storage by creating a slight vacuum in the regulated system 112, 300, 400 as it gives up fluid.

The lower body housing 204 contains the checked flow zone 244 of the fuze assembly 200. When fluid flow parameters have been exceeded, the metering ball 206 enters the checked flow zone 244 where it is retained by the retainer 210 unless there is sufficient differential pressure and flow to push it back past the retainer assembly 210 into the regulated flow zone 220. The lower body housing 204 provides the metering ball 206 seat which resists high pressures applied to the metering ball 206, holds the retainer 210 in its required position, holds the metering ball return spring 208 in its seat, and preferably threads into the upper body housing 202 to allow assembly and disassembly of the fuze assembly 200.

The retainer 210, as stated herein above, holds the metering ball 206 in the checked flow zone 244 until sufficient differential pressure and fluid flow is exerted to urge the metering ball 206 back through the retainer 210. The present inventors have found the retainer 210 can be made very sensitive by precise spring loading and design so that repeatable and reliable performance in response to specific threshold differential pressures can be achieved.

The booster seal 216 ensures against leakage around the metering ball 206 when the metering ball 206 is retained in the checked flow zone 244. In systems where back pressures and flow are very slight, the booster seal 216 provides the metering ball 206 with an additional boost to push it past the retainer 210. In cold temperature applications, the booster seal 216 contracts with temperature and provides an even larger boost to eject the metering ball 206 from the checked flow zone. Most preferably, the booster seal 216 is comprised of a material commonly known to those skilled in the art, to resist chemical attack in modern hydraulic braking system applications.

The metering ball return spring 208 functions to urge the metering ball 206 to position 'A' where it is positioned normally to start each stroke. The speed of metering ball 206 return is a parameter of great interest because such reset times determine how quickly a temporarily disabled or over extended system will return to normal operation. Spring forces are a factor in setting the regulated reset fluid flow rate. In brake system applications, this is a measure of how quickly a "pushed back" caliper piston condition will be returned to normal operation and also how large a flow rate will be required to set the fuze assembly 200 as well as the speed necessary to set the fuze assembly 200 to prevent fluid flow around the metering ball 206.

Figures 3A, 3B:
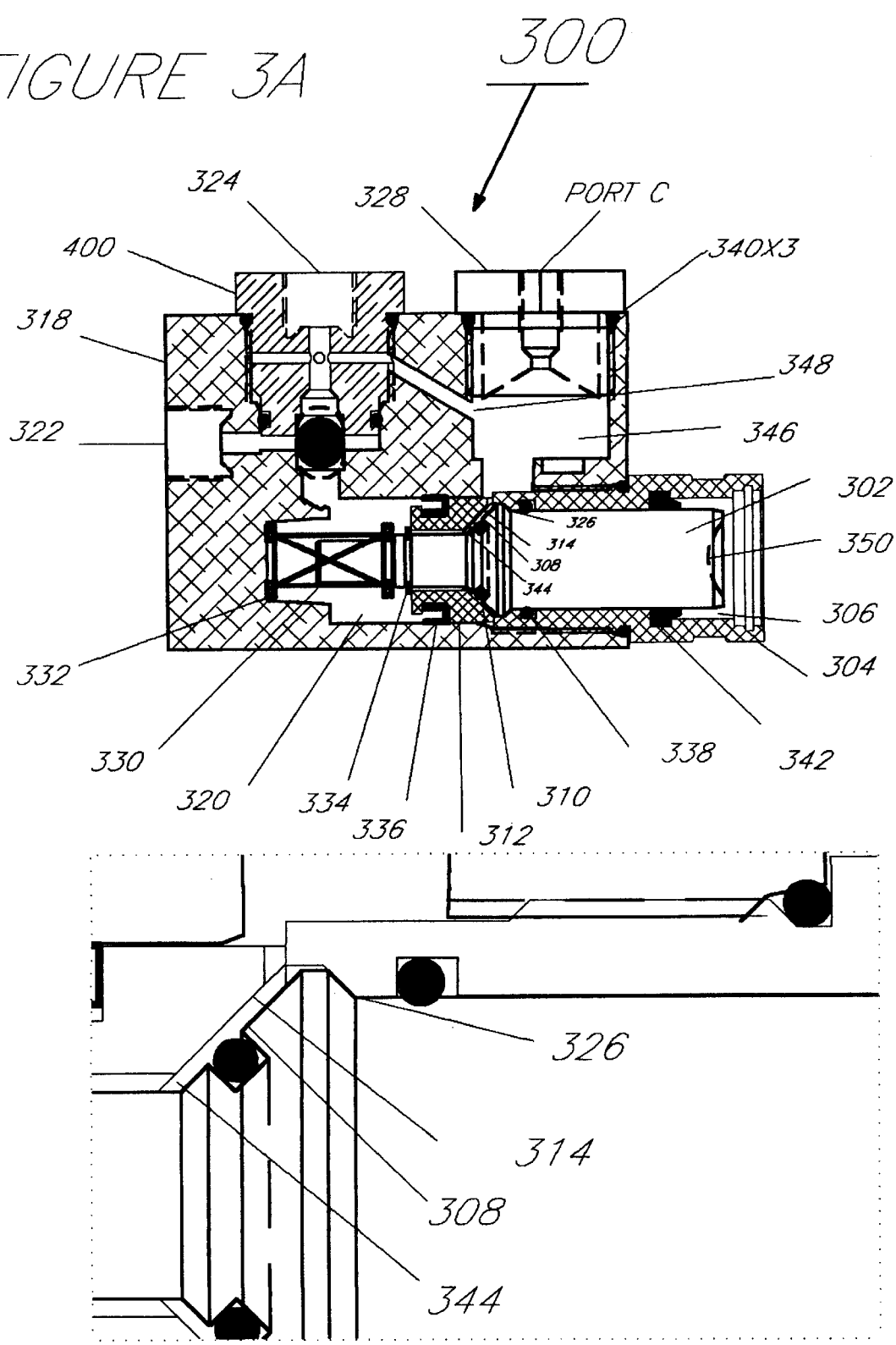
FIG. 3A is a detailed cutaway view illustrating an in-line secondary master cylinder suitable for use in accordance with one embodiment of the present invention as shown in FIG. 1.
FIG. 3B is an enlarged cutaway view more clearly depicting structural details of selected portions of the in-line master cylinder illustrated in FIG. 3A.

FIGS. 3A and 3B illustrate a detailed cutaway view illustrating a manually operated in-line secondary master cylinder 300 suitable for use in accordance with one embodiment of the present invention as shown in FIG. 1. This manually operated in-line secondary master cylinder 300 can be adapted for use with any hydraulic system which accommodates multiple manual input forces, and which requires the secondary input device to operate independently of the primary input device. The particular embodiment 300 is illustrated for use in a hydraulic brake system 100 which must accommodate both hand and foot brake inputs to the brake system, either independently or simultaneously. The present inventive secondary master cylinder 300 can be employed in any application where: 1) it is necessary or desirable to have more than one master cylinder to generate fluid flow and pressure in order to operate one or more subsystems independently of the primary master cylinder inputs, 2) an emergency or backup source of pressure is desirable without the encumbrances of maintaining two physically separated systems, 3) an in-line pressure booster is needed to step up pressure provided by a primary system, 4) the need exists to initiate a pressure stroke in a system which may already have been pressurized from a different source, 5) a need exists to provide for completely independent operation of two interrelated hydraulic pressure sources, but also allow these independent sources to operate simultaneously in the same hydraulic circuit, and/or 6) a need exists to allow for the elimination of any connection to a remote reservoir, except through existing system pressure lines, although it will readily be appreciated by those skilled in the art, the present invention is not so limited.

Significantly, the present innovative secondary master cylinder 300 may incorporate a fully pressurized body housing 318. This feature allows the secondary master cylinder 300 to be placed directly in a primary system operating pressure line 116, where it has no effect on system operation until it is actuated. Unlike a more typical master cylinder, the present secondary master cylinder 300 draws a very small amount of charging fluid directly from the primary system line 116. This action is accomplished using a split piston, free backflow, volume displacement approach, discussed herein below. The secondary master cylinder 300 is generally actuated by manual operator inputs.

The secondary master cylinder 300 can be easily adapted to generate flow into a downstream line only simply by placing a check valve in the input port 324. When the secondary master cylinder 300 is utilized as an independent brake system actuator, such as in combination hand and foot operated vehicle brake system 100, it must be used with a flow control valve such as the hydraulic input flow control valve 400 designed specifically for brake system applications and illustrated in FIGS. 3 and 4. When configured as a secondary master cylinder in a brake pressure line application, the present inventive secondary master cylinder 300 can be specially valved by an input flow control valve having a lengthened ball travel to provide a pressure boost to primary system brake pressure for increased brake system effectiveness by persons who are handicapped or have inadequate strength to operate the primary system without additional force input. Alternatively, the secondary master cylinder 300 can also be reconfigured as the primary pressure source. This flexibility in application provides a substantial advantage over standard vented reservoir master cylinders familiar to those skilled in the art.

With continued reference to FIGS. 3A and 3B, it can be seen that as the piston 302 is urged further into the bore 306 of its housing sleeve 304, its tapered face 308 and piston face seal 310 makes contact with the mating tapered face 314 of a floating piston 312. The floating piston 312 movement is restricted by clip 334 which is concentric with the bore 320 of the secondary master cylinder housing 318. As the piston 302 and floating piston 312 are stroked forward and urged closer together, hydraulic fluid is displaced through an exit port 322. The volume of fluid displaced is equal to the volume reduction of the housing bore 320. As the piston 302 commences its return stroke, it separates from the floating piston 312 when pressure drops to less than the amount necessary to maintain the floating piston 312 against the tapered face 308 of the piston 302, or when the floating piston 312 reaches the positive stop face 326 of the piston sleeve 304. At this moment in time, pressures on both sides of the piston 302 are equalized and fluid is allowed to free flow through small grooves 344 between the tapered face 314 of the floating piston 312 and the piston sleeve 304. This action allows the pumping chamber (housing bore 320) to be recharged with hydraulic fluid and to equalize pressures within the housing 318 and the input port 324.

The arrangement illustrated in FIGS. 3A and 3B provides several distinct advantages for the present inventive brake system 100 over those brake systems known to those skilled in the art. For example, the secondary master cylinder 300 pressure stroke can be initiated regardless of existing pressures in the housing 318 and output port 322. Unlike current master cylinders, this arrangement does not require a compensation port in the pressure generating chamber. Most of the displaced hydraulic fluid is produced by volume reduction of the pumping chamber 320, which is being filled with the piston 302 itself. Thus, for single stroke applications, very little system fluid is required. Further, the secondary master cylinder 300 can be mounted in any orientation with only air bleed port location changes. Where redundant operation of end use device(s) is desirable, the present secondary master cylinder 300 can eliminate the need for two separate flow lines to end use device(s), as well as the necessity for two chambers within the device(s). The secondary master cylinder 300 can also be readily switched over to a stand-alone configuration for use in other applications simply by connecting a return line to the input port 324 and replacing the fluid chamber cap 328 with a removable vented stand pipe type reservoir.

In summation, the secondary master cylinder housing 318 contains the working components of the pumping assembly 300 and provides the necessary fluid flow passages, connections and bores for the assembly 300 to operate. The housing 318 is fully pressurized to offer full pressure connection at the fluid input port 324 and fluid output port 322. The housing 318 mounts in any orientation with no need for venting or providing a separate reservoir, although air bleeding may still be necessary in specific applications.

The piston sleeve 304 houses and protects the piston 302 and completely envelopes the piston 302, providing substantial support to resist actuation side forces from eccentric end loading. The sleeve 304 also shields the piston 302 against extremely wet and dirty environments.

The piston 302 transmits the input force via the hydraulic fluid and carries and engages the floating piston 312 such that sealing is obtained and consummated by the relative motion between the two components 302, 312. A tapered face 308 provides a substantially larger bearing surface to reduce the surface contact stresses and potential component wear and to provide positive centering of the floating piston 312. The tapered face 308 also provides a structure to retain the face seal 310 and also provides a double seal (tapered metallic face 308 to tapered metallic face 314 as well as via face seal 310). Further, a spherically shaped actuation cup 350 provides for use in applications where the actuating input device(s) may rock through an arc of motion.

A floating piston 312 seals against the piston 302 and the bore of the housing 318 to effect pumping and pressure generation as it floats back and forth on the piston 302 to open and close the flow passages 344 on its interior. As stated herein above, the floating piston 312 provides pressure equalization when it engages the leading edge 326 of the piston sleeve 304 and separates from the sealing surface 308 of the piston 302, preventing trapped pressure at the end of the return stroke.

A retainer 334 limits the travel of the floating piston 312, fixing the maximum clearance between the piston 302 and the floating piston 312 tapered faces 308, 314 while a return spring 330 returns the piston 302 to its initial unstroked position. Washers 332 are provided to provide structural integrity and secure the return spring 330. With continued reference to FIG. 3A, it can be seen numerous additional seals 336, 338, 340 are provided at strategic locations to prevent fluid leakage between moving surfaces and a wiper 342 is additionally provided to maintain piston 302 surface integrity and promote piston 302 longevity.

Figure 4:
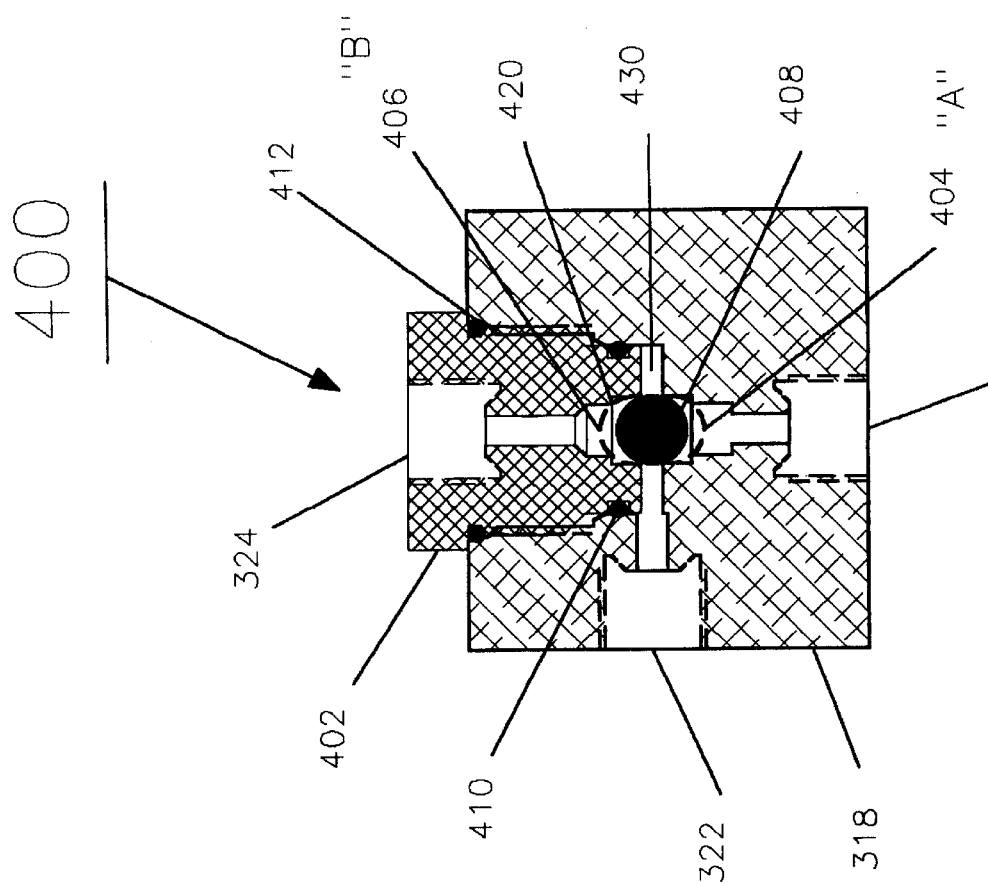
FIG. 4 is a detailed cutaway view illustrating a subsystem hydraulic input flow control valve assembly suitable for use in accordance with one embodiment of the present invention as shown in FIG. 1.

Moving now to FIG. 4, a detailed cutaway view illustrating a subsystem hydraulic input flow control valve assembly 400 suitable for use in accordance with one embodiment of the present invention as shown in FIG. 1 is shown. The input valve assembly 400 can be easily adapted for use in any vehicle brake system which accommodates multiple, e.g. hand and foot, manual input forces and which must maintain independence of operation between the hand and foot hydraulic subsystems such that failure of one of the two subsystems will not disable or adversely impair the performance of the other. Although the input valve assembly 400 comprises a plurality of specific features for use in hydraulic brake systems, the assembly 400 can be easily adapted for use in other applications which require two hydraulic input flows to be directed to a single output port such that: 1) the lower pressure supply will be sealed off from the higher pressure supply when there are different pressure inputs, 2) an intermediate position exists during which both inputs can supply hydraulic fluid to the output simultaneously, 3) very high reliability is inherent and essential in long term service due to serious consequences of failure, 4) the total flow area through the valve assembly 400 must remain very high throughout the transition from a primary flow position 404 to a secondary flow position 406 to offer minimal flow restriction at all times during repositioning of the valve assembly 400, 5) very low pressures and low flow volumes can accomplish the valve assembly 400 position 404, 406 transitions very quickly, 6) the ability to embody the valve assembly 400 within other system devices to save space and cost is desirable, 7) movement of the valving ball 408 does not result in perceptible back pressures in switching or returning fluid flows, and 8) the design approach must accommodate high volume production and assembly rates for low cost applications, although it will readily be recognized by those skilled in the art, the present invention is not so limited.

Figure 6:
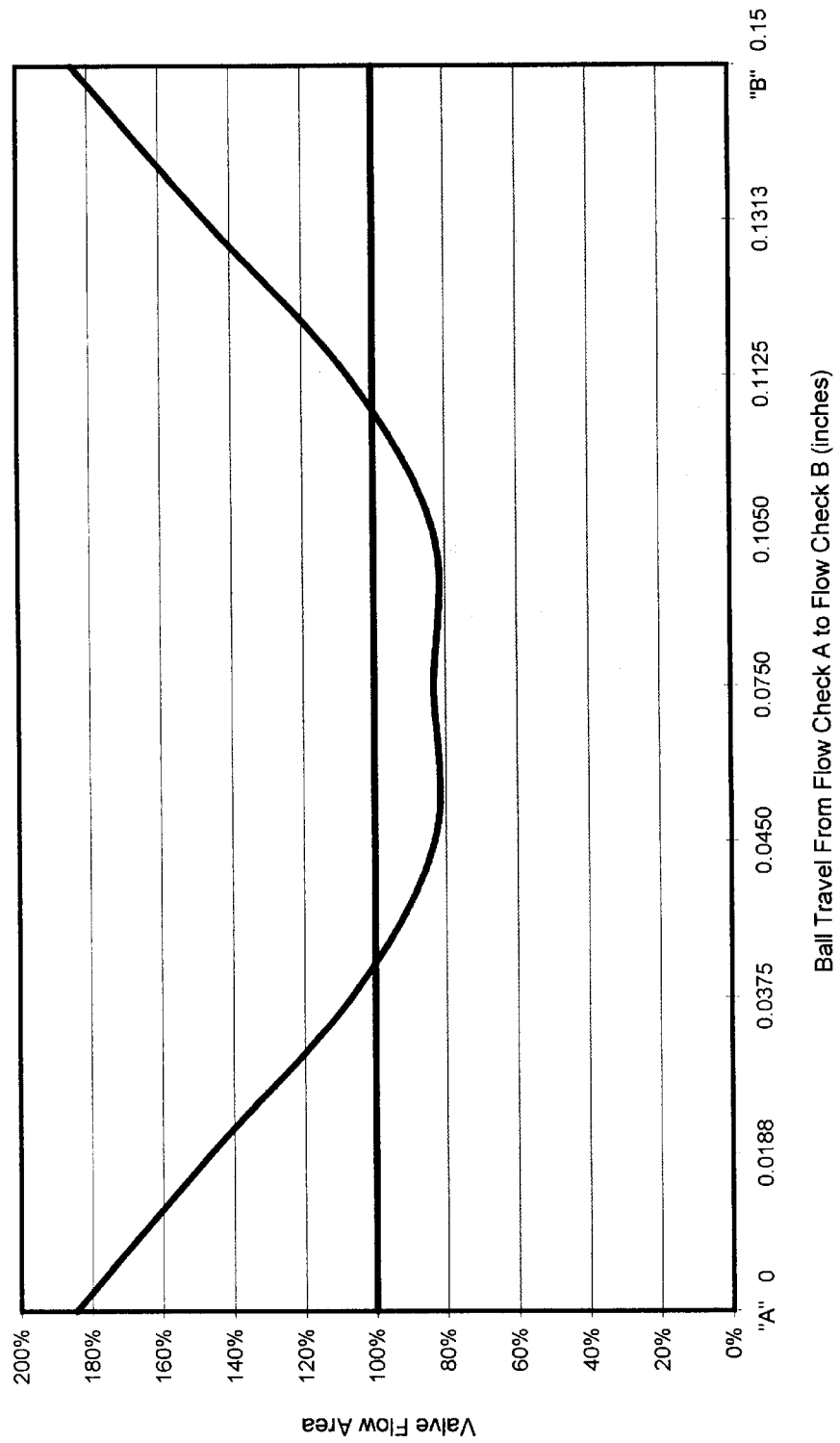
FIG. 6 is a graph illustrating the efficiency of the input flow control valve assembly depicted in FIG. 4 based upon actual valve assembly flow area as a percentage of maximum practical fluid transmission line flow area for a standard 3/16-inch fluid line.

The present inventive hydraulic input flow control valve assembly 400 has a flow geometry which provides very high flow volumes through the valve assembly 400 at all times and which requires an extremely short length of travel for the valving ball 408 to travel from one seat position 404 to the opposite seat position 406 as depicted in FIG. 6. The valve assembly 400 operates effectively with only a very small volume of hydraulic fluid required for a closed port to be opened to a full flow position. The unique flow valve assembly 400 structure utilizes a two piece centered half construction process which reduces cost and improves quality by enabling each valve seat 404, 406 to be held concentric only to its adjacent bore, and to machine one of the halves directly into an adjoining component part 318, 402. This unique structure provides a method of obtaining a precise flow gap in the center of the valve assembly 400.

Looking again at FIG. 4, it can be seen that the input flow control valve assembly 400 has only one moving part, the checking ball 408 which travels a very short distance between its two seat positions 404, 406. As stated herein above, the valve assembly 400 is designed preferably for use in multiple manual input force brake systems. Specifically, it is the component which seals off the primary subsystem from the secondary subsystem when hydraulic fluid flows are switching from one to the other. The input flow control valve assembly 400 also allows simultaneous operation of both subsystems as stated herein before. If the primary subsystem becomes damaged or inoperative, the input flow control valve assembly 400 automatically reacts to the lower pressure and seals the damaged or unused portion of the subsystem from the remaining subsystem to ensure continued operation of a portion of the vehicle braking system. The input flow control valve assembly 400 can be housed and mounted independently, or can be incorporated into other devise bodies as it is shown in FIG. 3A. The valve assembly 400 can be seen to utilize three-way fluid flow ball checking valve principles, comprising the ability to accommodate simultaneous flow in all three ports. The present inventors have therefore recognized numerous problems associated with dual input manual brake systems and have applied the aforesaid principles to arrive at the present novel solutions to those problems.

With continued reference to FIG. 4, the flow control valve assembly 400 comprises an upper body housing 402 which provides the upper seat position 406 for the checking ball 408 to seal against and also provides a guiding bore 420 for the ball 408 to travel within as it approaches or leaves the upper seat position 406. The upper body housing 402 comprises a novel structure which ensures the base of the upper body housing 402 will stay a specific distance away from the mating half lower body housing 318 to provide a precise gap for fluid flow without the necessity for machining a special flow port. This large diametrical gap 430 at the center of the valve assembly 400 provides a very large 360 degree flow area for fluid to be directed out the exit port 322 of the valve lower body housing 318, and facilitates the extremely short travel length of the ball 408, as well as reduced manufacturing costs. This aforesaid short travel length is very important in manual brake systems where there is very limited fluid available from the master cylinder to operate the brakes.

The checking ball 408 is positioned to travel back and forth within the valve assembly 400 to check the flow of fluid from the port having the lower pressure, e.g. port 324 or port 440.

The lower body housing 318, as stated above, is largely the same as the upper body housing 402 from a fluid flow standpoint, but additionally must include provisions for removably mating with the threaded portion of the upper body housing 318 and provide a sealing surface for the static body seal necessary to keep the assembly 400 from leaking after it is fully assembled. Simple O-Ring seals 410, 412 are provided to prevent leakage from occurring between the two body housing portions 402, 318.

FIG. 6 is a graph illustrating the efficiency of the input flow control valve assembly 400 depicted in FIG. 4 based upon actual valve assembly flow area as a percentage of maximum practical fluid transmission line flow area for a standard 3/16-inch fluid line as the checking ball 408 travels from its low seat position 404 to its upper seat position 406. It can be observed that as the checking ball 408 travels from it low seat position 404 to its upper seat position 406 and its centerline passes the lower edge of the flow groove 430, the valve assembly 400 flow area remains approximately constant. This is because any flow area lost on one side of the checking ball 408, as it passes into the flow groove 430, is gained on the other side until the centerline of the checking ball 408 passes the upper edge of the flow groove 430. The embodiment characterized by the graph in FIG. 6 was found by the present inventors to require a total analytical displacement volume of only 0.009 cubic inch of fluid to move the checking ball 408 from its low seat check position 404 to its upper seat check position 406, making the inventive control valve assembly 400 extremely sensitive and fast to react to flow input changes. The present inventors found that it was virtually impossible in actual applications to balance the checking ball 408 in suspension between the low seat position 404 and the upper seat position 406 due to its extreme sensitivity to pressure differentials. Because the checking ball 408 is essentially friction free during its travel periods, the amount of time during which the flow area is less than 100% is undetectable in actual use. The graph illustrated in FIG. 6 was determined with a reference base flow area comprising 75% of a 3/16 inch fluid transmission line as the full line diameter is not available in actual practice due to system flow restrictions caused by fittings, connectors, porting and tolerances.

Keeping the foregoing detailed descriptions of the present inventive system and component structures, functions and operations in mind, a plurality of potential brake system problems and use of the present invention to cure those problems is discussed herein below. For example, a slow fluid leak can occur in the secondary brake system during use. When this condition occurs, the hydraulic fluid reservoir replenishes lost fluid as required and the secondary brake continues to function normally from both master cylinders 108, 300. The vehicle will notice that as the primary reservoir continues to lose fluid, the primary master cylinder 108 will go soft, while the secondary master cylinder 300 performs normally. The primary master cylinder 108 will not be affected until the fluid level gets sufficiently low, at which time air enters the systems, causing the brake stroke to feel soft. The fuze assembly 200 will continue to operate normally and will not set during this time period. Finally, reduced braking via the secondary master cylinder 300 is felt by the operator as fluid continues to be lost. Thus, the present inventive hydraulic brake system 100 provides the vehicle operator with sufficient warning, allowing the operator to locate and repair the slow fluid leak before complete brake system failure.

A slow fluid leak can also occur in the secondary brake system during periods of nonuse. When such a condition occurs, the fuze assembly 200 will operate normally to seal itself and prevent further fluid loss. The primary brake system will then be unaffected as the fuze assembly 200 prevents further system leakdown. If sufficient fluid remains in the reservoir prior to resumed use of the brake system, then use of the secondary master cylinder assembly 300 may unset the fuze assembly 200, causing the inventive brake system 100 to operate as described above during periods of use accompanied by a slow fluid leak.

A rapid fluid leak in the secondary system during use will leave the front brakes 110, 114 unaffected as the fuze assembly 200 will set and seal off the secondary master cylinder 300 and associated caliper(s) 112. The operator will notice the secondary master cylinder 300 inputs are soft and have no feel as the secondary brake will not be functional following setting of the fuze assembly 200. The operator will also notice the primary master cylinder 108 will feel soft on first use, until the fuze assembly 200 sets itself, at which time the primary master cylinder 108 input will feel normal to the operator. The rapid fluid leak in the secondary system during use will cause the fuze assembly 200 to set upon the first use of the primary master cylinder 108. Thus, the brake system ahead of the fuze assembly 200 will continue to function normally and the fuze assembly 200 will prevent fluid loss to the secondary system.

Performing system maintenance can sometimes introduce air into the secondary system. When this condition occurs, the primary or secondary inputs will be soft on first use. The vehicle operator will observe that the fuze assembly 200 has sealed off the secondary system, but that applying a secondary master cylinder 300 input will unset the fuze assembly 200 when this condition has occurred. Following setting of the fuze assembly 200, the primary system will be isolated and stroking the primary system will feel normal to the operator. If the fuze assembly 200 has not been set following introduction of air into the secondary system, application of a primary system input may set the fuze assembly 200 while subsequent application of a secondary system input will unset the fuze assembly 200. Air trapped within the secondary system can be removed via brake system bleeding, a process familiar to those skilled in the art. During the bleeding process, the secondary master cylinder 300 input will feel soft on first use. Continued use of the secondary master cylinder 300 will pull fluid from the primary system to support the bleeding process. Subsequent to bleeding, the secondary master cylinder 300 will operate normally.

Maintenance procedures can also introduce air into the secondary master cylinder assembly 300. A soft brake condition occurs as this air is compressed in the secondary master cylinder assembly 300 due to pressure generated from the primary master cylinder 108. This softness may be unnoticeable until enough air enters the system to create sufficiently soft brakes, at which time the fuze assembly 200 will set causing the primary brakes to operate normally. Because the primary master cylinder 108 can operate the entire brake system 100, the primary master cylinder input will feel soft until sufficient air is bled from the system 100, or the fuze assembly 200 sets itself. The fuze assembly 200 will set from a primary system input and will unset from a secondary system input if the secondary master cylinder 300 is filled with sufficient fluid, as stated herein before. Air which is discharged into a brake system line will normally rise to the primary master cylinder 108 and pass through the fuze assembly 200, allowing the secondary master cylinder 300 to be bled.

A leak can occur in the primary system during use. Continual fluid loss in the primary system can ultimately cause the primary master cylinder reservoir to be depleted causing the primary master cylinder 108 to draw air and the input to feel soft. This condition will allow the fuze assembly 200 to remain in its normal unset condition as the secondary brake system functions normally using fluid from within its own system and fluid from within the secondary master cylinder 300.

Similarly, a leak can also occur in the primary system during periods of nonuse. This condition occurs, for example, when the primary master cylinder 108 fluid is depleted through a slow drain down, but is not detected until first use. The vehicle operator will notice a primary input which feels completely soft upon first use and a secondary input which is functioning normally. The primary master cylinder 108 is thus drained down and inoperative during which time the fuze assembly 200 remains in its normal unset condition. The secondary master cylinder 300 will continue to function normally, using fluid within its own internal system and also fluid which feeds down from the primary system fluid lines.

Another undesirable condition sometimes occurs when a rear brake caliper 112 piston gets "pushed back" from its rotor. When this condition occurs, fluid is forced out of the caliper housing and back through the system, into the primary master cylinder 108 reservoir. Existing systems may lose all brakes on first use, but the present invention will use the fuze assembly 200 to seal off the rear system, providing metered amounts of fluid flow to reposition the rear caliper piston against the rotor until normal operation is restored without loss of the front brakes at any time. The operator will subsequently experience normal front brake operation and abnormal rear brake operation, i.e. the rear caliper(s) 112 requires several braking cycles to return to normal operation. The fluid which has been forced out of the caliper housing into the master cylinder 108 is collected within the primary master cylinder reservoir and subsequently returned to the secondary system during the aforesaid several rear caliper(s) 112 braking cycles. During the rear caliper(s) 112 braking cycles, the fuze assembly 200 cycles between its set and unset positions until system 100 operation returns to normal. The secondary master cylinder 300 is unaffected by "push back", and can readily apply pressure to return the rear caliper(s) 112 to normal operation.

The present inventive hydraulic brake system can be prepared for normal vehicle operation utilizing a "power fill" process during assembly. This process can be performed by evacuating the system from the primary portion of the system and simultaneously filling the system with fluid via the secondary portion of the system during which time all system checks remain open. The brake system 100 fills normally from the secondary master cylinder 300, although the present invention is not so limited. Thus, the primary master cylinder 108 is evacuated and draws fluid up from the secondary master cylinder 300 fill point, during which time the fuze assembly 200 also remains open to free flow. Upon completion of the foregoing "power fill" process, application of the first primary system input will put the fuze assembly 200 in its normal travel range.

This invention has been described herein in considerable detail in order to provide those skilled in the art with the information needed to apply the novel principles and to construct and use such specialized components as are required. In view of the foregoing descriptions, it should be apparent that the present invention represents a significant departure from the prior art in construction and operation. However, while a particular embodiment of the present invention has been described herein in detail, it is to be understood that various alterations, modifications and substitutions can be made therein without departing from the spirit and scope of the present invention, as defined in the claims which follow. For example, it will be apparent to those skilled in the vehicle brake system art that although particular combinations of inventive hydraulic subsystems and subsystem components have been illustrated, that many other combinations of subsystems using the present inventive subsystem components will also work to provide the intended function of providing a vehicle brake system which accommodates both primary and independent secondary brake subsystem actuation forces, while maintaining independence between the two subsystems such that failure of one of the two subsystems will not disable the other, even though they share common hydraulic circuits.

We claim:

1. A hydraulic brake system comprising:
   a primary master cylinder;
   a primary hydraulic brake circuit coupled to said primary master cylinder;
   at least one secondary master cylinder;
   at least one secondary hydraulic brake circuit wherein each said at least one secondary master cylinder is coupled to a secondary hydraulic circuit selected from said at least one secondary hydraulic brake circuit;
   at least one hydraulic input flow control valve assembly, wherein each said at least one hydraulic input flow control valve assembly is coupled in-line with a secondary hydraulic brake circuit selected from said at least one secondary hydraulic brake circuit such that each said at least one in-line hydraulic input flow control valve assembly directs fluid input flow to said selected at least one secondary hydraulic brake circuit from a dominant flow source, wherein said dominant flow source is selected from any one of said primary master cylinder and said at least one secondary master cylinder; and
   a hydraulic fuze assembly having a first port hydraulically coupled to said primary master cylinder via a first hydraulic coupling circuit and a second port hydraulically coupled to said at least one secondary master cylinder via a second hydraulic coupling circuit, said fuze assembly adapted to sense hydraulic fluid flow volume passing through the fuze assembly between the first port and the second port and isolate said at least one secondary master cylinder from said primary master cylinder and said first hydraulic brake circuit when a predetermined flow volume is exceeded within said fuze assembly and reset with a specific backpressure.

2. The hydraulic brake system of claim 1 wherein said hydraulic fuze assembly is further adapted to sense at least one of hydraulic fluid flow rate, hydraulic fluid flow direction, secondary hydraulic circuit back pressure, and hydraulic fluid temperature.

3. The hydraulic brake system of claim 2 wherein said primary hydraulic brake circuit comprises at least one brake caliper.

4. The hydraulic brake system of claim 3 wherein said at least one secondary hydraulic brake circuit comprises at least one brake caliper.

5. The hydraulic brake system of claim 3 wherein said at least one primary hydraulic brake circuit caliper comprises at least one front caliper.

6. The hydraulic brake system of claim 4 wherein said at least one secondary hydraulic brake circuit caliper comprises at least one rear caliper.

7. A hydraulic brake system comprising:
   a primary master cylinder;
   a primary hydraulic brake circuit coupled to said primary master cylinder;
   at least one secondary master cylinder;
   at least one secondary hydraulic brake circuit coupled to each said at least one secondary master cylinder; and
   at least one of a hydraulic fuze assembly and a hydraulic input flow control valve assembly, said hydraulic fuze assembly having a first port hydraulically coupled to said primary master cylinder via a first hydraulic coupling circuit and a second port hydraulically coupled to said at least one secondary master cylinder via a second hydraulic coupling circuit, said fuze assembly adapted to sense hydraulic fluid flow volume passing through said fuze assembly and isolate said at least one secondary master cylinder from said primary master cylinder and said primary hydraulic brake circuit when a predetermined flow volume is exceeded within said fuze assembly, said control valve assembly comprising an in-line hydraulic input flow control valve coupled in-line with said second hydraulic coupling circuit such that said control valve directs fluid input flow to said at least one secondary hydraulic brake circuit from a dominant flow source, wherein said dominant flow source is selected from any one of said primary master cylinder and said at least one secondary master cylinder.

8. The hydraulic brake system of claim 7 wherein said hydraulic fuze assembly is further adapted to sense at least one of hydraulic fluid flow rate, hydraulic fluid flow direction, hydraulic back pressure within said second hydraulic brake circuit, and hydraulic fluid temperature.

* * * * *